United States Patent [19]

Hanusa

[11] Patent Number: 4,753,837

[45] Date of Patent: Jun. 28, 1988

[54] NOVEL LAMINATED PANEL

[75] Inventor: Lothar H. Hanusa, Pittsburgh, Pa.

[73] Assignee: Mobay Corporation, Pittsburgh, Pa.

[21] Appl. No.: 48,422

[22] Filed: May 11, 1987

[51] Int. Cl.⁴ .................. B32B 3/02; B32B 5/14; B32B 5/22

[52] U.S. Cl. .................. 428/86; 428/139; 428/309.9; 428/317.9

[58] Field of Search .................. 428/86, 309.9, 139, 428/140, 317.9

[56] References Cited

U.S. PATENT DOCUMENTS

| | | | |
|---|---|---|---|
| 3,591,444 | 7/1971 | Hoppe | 428/309.9 |
| 3,900,651 | 8/1975 | Hoppe et al. | 428/86 |
| 3,903,346 | 9/1975 | DeLeon et al. | 428/317.1 |
| 3,940,517 | 2/1976 | DeLeon | 427/373 |
| 3,940,524 | 2/1976 | Hoppe et al. | 428/86 |
| 4,025,687 | 5/1977 | Wooler et al. | 428/318.4 |
| 4,028,158 | 6/1977 | Hipchen et al. | 156/79 |
| 4,043,719 | 8/1977 | Jones | 425/115 |
| 4,118,533 | 10/1978 | Hipchen et al. | 428/297 |
| 4,212,917 | 7/1980 | Skowronski et al. | 428/318.4 |
| 4,271,273 | 6/1981 | Biranowski et al. | 521/110 |
| 4,284,683 | 8/1981 | Hipchen et al. | 428/285 |
| 4,292,353 | 9/1981 | Ohashi et al. | 428/211 |
| 4,292,361 | 9/1981 | Ohashi et al. | 428/215 |
| 4,292,363 | 9/1981 | Briggs | 428/247 |
| 4,292,369 | 9/1981 | Ohashi et al. | 428/317.5 |
| 4,296,170 | 10/1981 | Ohashi et al. | 428/317.5 |
| 4,311,801 | 1/1982 | Skowronski et al. | 521/110 |
| 4,316,935 | 2/1982 | Moss | 428/304.4 |
| 4,335,218 | 6/1982 | DeGuiseppi | 521/99 |
| 4,346,133 | 8/1982 | Hipchen et al. | 428/109 |
| 4,351,873 | 9/1982 | Davis | 428/198 |
| 4,362,678 | 12/1982 | Skowronski et al. | 264/46.3 |
| 4,386,166 | 5/1983 | Peterson et al. | 521/99 |
| 4,386,983 | 6/1983 | Hipchen et al. | 156/79 |
| 4,411,949 | 10/1983 | Snider et al. | 428/304.4 |
| 4,438,166 | 3/1984 | Gluck et al. | 428/113 |
| 4,459,334 | 7/1984 | Blanpied et al. | 428/219 |
| 4,467,014 | 8/1984 | Smith | 428/314.4 |
| 4,481,307 | 11/1984 | Frentzel | 521/115 |
| 4,496,625 | 1/1985 | Snider et al. | 428/318.4 |
| 4,544,679 | 10/1985 | Tideswell et al. | 521/116 |
| 4,555,442 | 11/1985 | Frentzel | 428/318.4 |
| 4,572,865 | 2/1986 | Gluck et al. | 428/309.9 |
| 4,572,919 | 2/1986 | Londrigan | 521/115 |

Primary Examiner—William J. Van Balen
Attorney, Agent, or Firm—Gene Harsh; Joseph C. Gil

[57] ABSTRACT

The present invention is directed to a laminated panel comprising (a) a facing material, (b) a rigid foam adhered to said facing material, and (c) a three dimensional, open mesh structure either attached to or being an integral part of the inside surface of said facing material, said three dimensional, open mesh structure characterized as (i) being produced from relatively long fibers having length to diameter ratios of 50 or more (ii) being sufficiently open so that said foam penetrates through it to said facing material, (iii) being sufficiently stiff so that it will substantially retain its original three dimensional structure in the laminated panel, (iv) being sufficiently adhered to said facing material so that it will not pull away from said facing material during the production of said panel, and (v) having a thickness of at least five times the diameter of the fiber used to produce said mesh structure.

2 Claims, 1 Drawing Sheet

NOVEL LAMINATED PANEL

BACKGROUND OF THE INVENTION

The present invention is directed to a novel laminated panel which has a rigid foam core. Laminated panels having rigid foam cores are known in the art. See, e.g., U.S. Pat. Nos. 3,900,651, 3,903,346, 3,940,517, 4,025,687, 4,028,158, 4,043,719, 4,118,533 (and its Reissue 30984), 4,212,917, 4,271,273, 4,284,683, 4,292,353, 4,292,361, 4,292,363, 4,292,369, 4,296,170, 4,311,801, 4,316,935, 4,335,218, 4,346,133, 4,351,873, 4,362,678, 4,386,166, 4,386,983, 4,411,949, 4,438,166, 4,459,334, 4,467,014, 4,481,307, 4,496,625, 4,544,679, 4,555,442, 4,572,865 and 4,572,919.

It is known in the art to utilize fibers in various forms in the production of such laminated panels. The forms of the fibers and the reasons for their use are varied.

U.S. Pat. No. 3,900,651 relates to the same problem which faced the present Applicant, i.e., the production of a sandwich element designed to withstand high stresses. This problem is overcome in the '651 patent by adhesively joining flocked fibers to the facing material.

U.S. Pat. No. 4,025,687 relates to the reinforcement of the foam core. The core is reinforced by a "binding material" which may be embedded anywhere within the foam core but is preferably no deeper than approximately one inch from the outer surface of the foam core. Suitable "binding materials" disclosed are metal wires, filaments or meshes; glass, textile or plastic fibers, strands, filaments, strips or extrusion in single, random, woven or meshed form. As disclosed, the woven or meshed material must be of a sufficiently coarse mesh or weave to allow the foam to penetrate. Chicken wire is described as being the preferred material. As described, the purpose of the "binding material" was to prevent cracking of the foam core.

U.S. Pat. Nos. 4,292,361 and 4,292,369 describe the laying of a matted or woven fiber near the interface between the foam core and the facing material in order to enhance the fire resistance properties of the laminate.

U.S. Pat. No. 4,292,363 describes a laminated panel where a mesh of continuous glass fiber strands is embedded in multiple layers substantially throughout the thickness of the foam core. The laminate is described as a non-load bearing structure having enhanced fire resistance properties.

U.S. Pat. No. 4,438,166 describes adhering a facing material to a thin, substantially incompressible, yet expansible mat of long, layered glass fibers in order to reinforce the foam core.

U.S. Pat. No. 4,459,334 describes the use of a non-woven, relatively open glass fiber mat in order to increase the surface strength of the facing material, to increase the flex strength and dimensional stability of the laminate, and to offset any facing material delamination.

U.S. Pat. No. 4,572,865 describes the use of glass fiber for foam reinforcement purposes.

Finally, U.S. Pat. Nos. 4,028,158 (and its Reissue 30984), 4,284,683, 4,346,133 and 4,386,983 describe the use of a mat of long straight glass fibers arranged in layers and distributed evenly throughout the foam core in order to reinforce the core.

The covering of the back of the facings with non-woven fiber webs or the use of reinforcing webs such as glass fiber fabric is intended to increase the mechanical strength especially immediately underneath the facings and to improve the bond between the facings and the foam core as well as to obtain a profile of decreasing density from the facing layers to the center of the foam.

Facing materials are generally used which are impermeable or almost impermeable to gas. Gas bubbles of varying size accumulate underneath the upper facing as the foam expands. These gas bubbles subsequently make their mark on the visible surface of the product if the facings are thin sheets. The irregular bulges formed on the surface not only mar the appearance of the product but also increase the risk of damage to the facings at these points. It has been found that even the use of the conventional meshwork webs such as glass fiber fabrics and non-woven fiber fleeces cannot prevent the formation of gas bubbles. It was found that, depending on the particular nature of these webs, they sometimes showed patches that were completely free from foam, evidently because they had been completely penetrated by gas bubbles. In other cases, the reaction mixture had crept along inside a web, evidently due to capillary action, and formed a film of foam underneath which the gas bubbles accumulated. Although the film of foam together with the reinforcing web had to some extent stabilized the facing, these hollow patches were still more likely to be damaged by sudden impacts.

The problem facing the present Applicant was to eliminate the bubbling effect noted above while at the same time reinforcing the facing material so that the final laminate could withstand high stresses.

DESCRIPTION OF THE INVENTION

Figure 1:
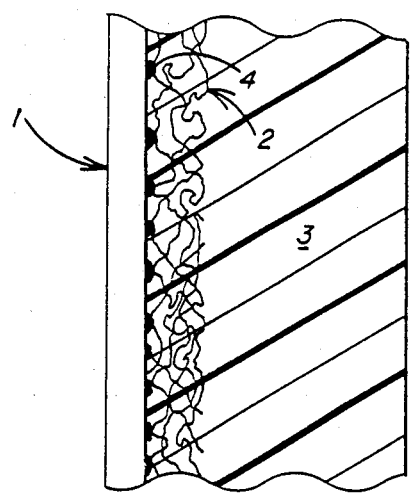
FIGS. 1 through 4 represent various embodiments of the present invention.

The present invention is directed to a laminated panel comprising
(a) a facing material,
(b) a rigid foam, preferably a rigid polyurethane and/or polyisocyanurate, adhered to said facing material, and
(c) a three-dimensional, open mesh structure either attached to or being an integral part of the surface of said facing material which contacts said foam, said three-dimensional, open mesh structure characterized as
  (i) being produced from relatively long fibers having length to diameter ratios of 50 or more,
  (ii) being sufficiently open so that said foam penetrates through it to said facing material,
  (iii) being sufficiently stiff so that it will substantially retain its original three-dimensional structure in the laminated panel,
  (iv) being sufficiently adhered to said facing material so that it will not pull away from said facing material during the production of said panel, and
  (v) having a thickness of at least five times the diameter of the fiber used to produce said mesh structure.

In general, the mesh structure need only be adhered to (or integral with) those areas of the facing material which in use will be subjected to high stress. In the case of laminated panels having two facer materials, separate mesh structures may be adhered to each facer or one thick mesh structure can be adhered to both facer materials.

The facer material and foam cores which can be used as well as the methods of production are known and are described, for example, in the above-noted U.S. patents, the disclosures of which are herein incorporated by reference.

The key to the present invention resides in the specific three dimensional, open mesh structure used. As noted, the mesh must satisfy several requirements. First, it must be produced from relatively long fibers having length to diameter ratios of 50 or more. In general, the length to diameter ratio will vary depending upon the diameter of the particular fiber. For example, for a relatively thick fiber (i.e. diameter of 1 mm), a length to diameter ratio of 50 would be sufficient. On the other, for very thin films, ratios as high as 50,000 and more than 250,000 are suitable. As used in defining the open mesh structure, the term "fibers" is intended to describe fibers, strands, filaments, strips or extrusions made from metal, glass, plastic or natural materials. The mesh structure must also be sufficiently open so that the foam penetrates through the mesh to the facing material. The structure must be sufficiently stiff so that it will substantially retain its original three dimensional structure in the laminated panel. This means that the structure will not be significantly compressed or expanded during the production of the panel.

The mesh structure must be sufficiently adhered to the facing material so that it will not pull away from the facing material during the production of the panel. In general, this can be accomplished by applying an adhesive to the entire surface of the facing material and then placing the mesh structure on top of the adhesive. Alternatively, the adhesive could be applied to the side of the mesh structure which is to contact the face material. In the case of a metallic structure, the mesh could also be welded or soldered to the facing material. Alternatively, the mesh structure could be incorporated in the facer during the production of the facer.

Finally, the mesh structure must have a thickness at least five times the diameter of the fiber used to produce the mesh structure, preferably at least ten times the diameter. This thickness is critical in order to allow for the dispersion of any trapped gas bubbles.

Figure 5:
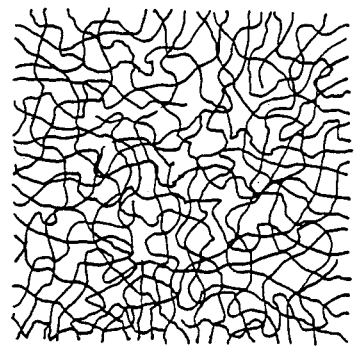
FIG. 5 is a top view of the presently preferred open mesh structure.

The presently preferred open mesh structures are mats of enmeshed nylon filaments sold by American Enka Corporation under the trademark "Enkamat". A top view of an Enkamat product is shown in FIG. 5. The currently preferred products have a thickness of 9 mm and 18 mm.

Figure 2:
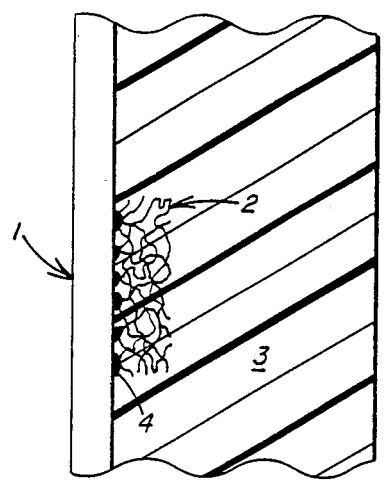
Figure 3:
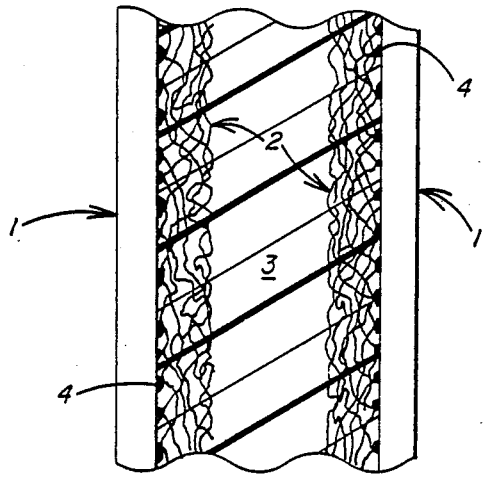
Figure 4:
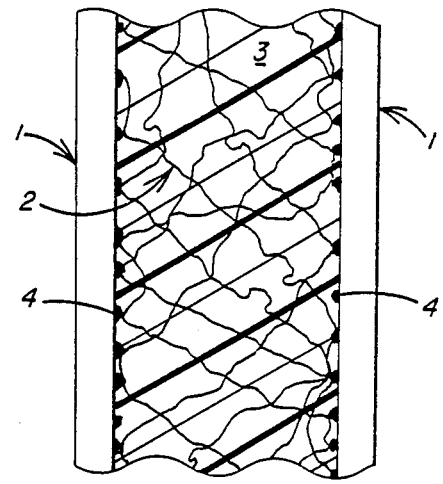

In the figures, 1 represents a facing material, 2 represents an open mesh structure, 3 represents the foam core, and 4 represents the zone of attachment of the mesh to the facer. In the case of FIG. 2, the mesh is only applied to those areas of the facing material which will see high stress during use. In FIG. 4, a single mesh is adhered to both facers.

The invention is further illustrated but is not intended to be limited by the following examples in which all parts and percentages are by weight unless otherwise specified.

EXAMPLES

A series of sandwich panels were prepared by the following technique. Two facers were separated by spacers. The following polyurethane formulation was used in each case:

POLYOL (i) 52 parts by weight of a sucrose/propylene oxide reaction product having an OH number of 470,
(ii) 35 parts by weight of a glycerin/propylene oxide reaction product having an OH number of about 470,
(iii) 13 parts by weight of Fyrol-6, a phosphorus flame retardant available from Stauffer Chemical Co.,
(iv) 0.4 parts by weight of water,
(v) 1.0 parts by weight of DC-193, a silicone surfactant available from Dow Corning,
(vi) 1.5 parts by weight of Polycat 8, an amine catalyst available from Abbott Labs, and
(vii) 17 parts by weight of R-11-SBA, an inhibited trichloromonofluoromethane, available from Pennwalt Co.

The isocyanate used was Mondur MR polyisocyanate, a commercially available polymethylene polyphenylisocyanate having an NCO group content of 31.5%, and an amine equivalent of 133. The isocyanate was used in each case in an amount such that the isocyanate index of the system was 110. The polyurethane reaction mixture was injected into the hollow space between the facers using a Hennecke HK-750 foam machine. The mixture was allowed to expand to fill the hollow space and to polymerize to form a rigid foam core. The panels were demolded and allowed to cure before testing.

Comparison Panels

Panels were prepared by the above-described technique. Facers (8.5 ft.×9 ft.) were separated by a metal frame or spacer 1.75 inches thick. Sufficient urethane reaction mixture was injected into the hollow cavity to give a rigid foam core with an overall molded density of 4.8 lbs. per cubic foot. For this test series, facers consisted of 0.017 inch thick aluminum sheet, 0.02 inch and 0.08 inch thick glass reinforced fiberglass (FRP). The aluminum sheet had an epoxy wash coat to improve adhesion of the urethane foam to the metal. Panels were made with aluminum facers on both sides and with FRP facers on both sides.

Panels According to the Invention

For these panels, the same facers and procedures described for the comparison panels were used. Symmetrical panels were prepared with an interface mat adhered to both facers.

To generate the interface, the mat described in FIG. 5 was bonded to each facer using a urethane adhesive. Both 9 mm thick and 18 mm thick mats were used. These facers were then handled in the same manner as the untreated panels described above. The identical amount of urethane foam mixture was used as with the comparison panels.

Test Results

The panels were cut and submitted for a variety of physical property tests. These included density (ASTM D-1622), and tensile adhesion (ASTM D-1623).

Tensile Adhesion

To determine the cohesiveness of the sandwich panels, the tensile adhesion measurement (ASTM D-1623) is considered most relevant. Small samples (2"×2"×thickness) are cut from the test panel. These are glued to test blocks. The force required to pull the sample is measured. The failure mode is reported. The sample may break in the foam core or at the core/facer boundary on either side. The values and obsevations reported are the average of multiple tests.

Peel Strength

To determine the peel strength of a particular facer, a 1 ft. wide×9 ft. long test sample was cut. The panel was fixed in place. The top skin was manually removed. The ease or difficulty of removing the top facer served as a measure of facer adhesion under peel or shear loading. The failure mode is reported. Observations include the amount of foam clinging to the facer.

|  | Comparison | With Interface |
|---|---|---|
| FOAM CORE SANDWICH WITH ALUMINUM FACERS | | |
| Number of samples | 6 | 12 |
| Type of interface | None | 9 mm thick Enkamat nylon mesh |
| Molded Foam Density, pcf | 4.80 | 4.80 |
| Avg. Tensile Adhesion value, psi | 41 | 25 |
| Failure at core/facer boundary, % of total number of tests | 33% | 8% |
| Manual Peel Strength Observation | Moderate to high Polymer film in some areas, thin foam layer in others | Extremely high Two people could not pull facer from foam core |
| FOAM CORE SANDWICH WITH 0.08 INCH THICK FRP FACERS | | |
| Number of samples | 6 | 6 |
| Type of interface | None | 9 mm thick Enkamat nylon mesh |
| Molded Foam Density, pcf | 4.80 | 4.80 |
| Avg. Tensile Adhesion value, psi | 37 | 40 |
| Failure at core/facer boundary, % of total number of tests | 67% | 0% |
| Manual Peel Strength Observation | Very low Thin polymer film on FRP | Extremely high FRP facer broke before foam core breakage or separation |
| FOAM CORE SANDWICH WITH 0.017 INCH FRP FACERS | | |
| Number of samples | 6 | 6 |
| Type of interface | None | 18 mm thick Enkamat nylon mesh |
| Molded Foam Density, pcf | 4.80 | 4.80 |
| Avg. Tensile Adhesion value, psi | 44 | 37 |
| Failure at core/facer boundary, % of total number of tests | 33% | 0% |
| Manual Peel Strength Observation | Very low Thin polymer film on FRP | Extremely high FRP facer broke before foam core breakage or separation |

Based on the lower tensile adhesion values, it would have been expected that the panel of the invention could be pulled apart more easily than the comparison panels. In fact the opposite occurred. The structural integrity of the sandwich construction was significantly increased. Unlike the comparison panels, the facers could not be peeled from the core without destroying the facer or the core itself.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A laminated panel comprising
   (a) a facing material,
   (b) a rigid foam adhered to said facing material, and
   (c) a three dimensional, open mesh structure either attached to or being an integral part of the inside surface of said facing material, said three dimensional, open mesh structure characterized as
      (i) being produced from relatively long fibers having length to diameter ratios of 50 or more
      (ii) being sufficiently open so that said foam penetrates through it to said facing material,
      (iii) being sufficiently stiff so that it will substantially retain its original three dimensional structure in the laminated panel,
      (iv) being sufficiently adhered to said facing material so that it will not pull away from said facing material during the production of said panel, and
      (v) having a thickness of at least five times the diameter of the fiber used to produce said mesh structure.
2. The panel of claim 1, wherein said foam is a polyurethane and/or polyisocyanurate foam.

* * * * *